United States Patent [19]

Seaman

[11] Patent Number: 5,291,799
[45] Date of Patent: Mar. 8, 1994

[54] UNITARY RATIO SELECTOR MECHANISM FOR A MULTIPLE RATIO MANUAL TRANSMISSION

[75] Inventor: Robert L. Seaman, Farmington Hills, Mich.

[73] Assignee: Borg-Warner Automotive, Inc., Sterling Heights, Mich.

[21] Appl. No.: 951,051

[22] Filed: Sep. 25, 1992

[51] Int. Cl.⁵ .................................. F16H 61/00
[52] U.S. Cl. ........................... 74/473 R; 74/477
[58] Field of Search .............. 74/475, 477, 483 R, 74/473 R

[56] References Cited

U.S. PATENT DOCUMENTS

| | | | |
|---|---|---|---|
| 1,791,137 | 2/1931 | Manville | 74/477 |
| 3,387,501 | 6/1968 | Frost | 74/335 |
| 4,033,200 | 7/1977 | Stockton | 74/740 |
| 4,305,308 | 12/1981 | Ballendux | 74/473 |
| 4,307,624 | 12/1981 | Mylenek | 74/477 |
| 4,335,623 | 6/1982 | Kronstadt | 74/477 |
| 4,338,828 | 7/1982 | Ruhlman | 74/475 |
| 4,515,029 | 5/1985 | Reynolds et al. | 74/339 |
| 4,726,249 | 2/1988 | Inuzuka et al. | 74/473 |
| 4,799,399 | 1/1989 | Bruce | 74/477 |
| 5,052,238 | 10/1991 | Jewell | 74/477 X |
| 5,105,674 | 4/1992 | Rea et al. | 74/473 R X |

FOREIGN PATENT DOCUMENTS 221774  9/1942  Switzerland ............ 74/477

Primary Examiner—Leslie A. Braun
Assistant Examiner—Khoi Ta
Attorney, Agent, or Firm—Brooks & Kushman

[57] ABSTRACT

A manual transmission mechanism adapted for use in an engine-driven automotive vehicle comprising a mainshaft and a countershaft, gearing arranged on each of said shafts, and synchronizer clutch structure which is arranged to accommodate a shift linkage mechanism for actuating the synchronizer clutch sleeve so the synchronizer clutch arrangement which makes possible a location of the driver-operated shift linkage in close proximity to the synchronizer clutch sleeves, permitting an efficient shift pattern for the driver-controlled shifter and permitting a simplified assembly of the linkage mechanism with minimum stack-up tolerance errors.

6 Claims, 9 Drawing Sheets

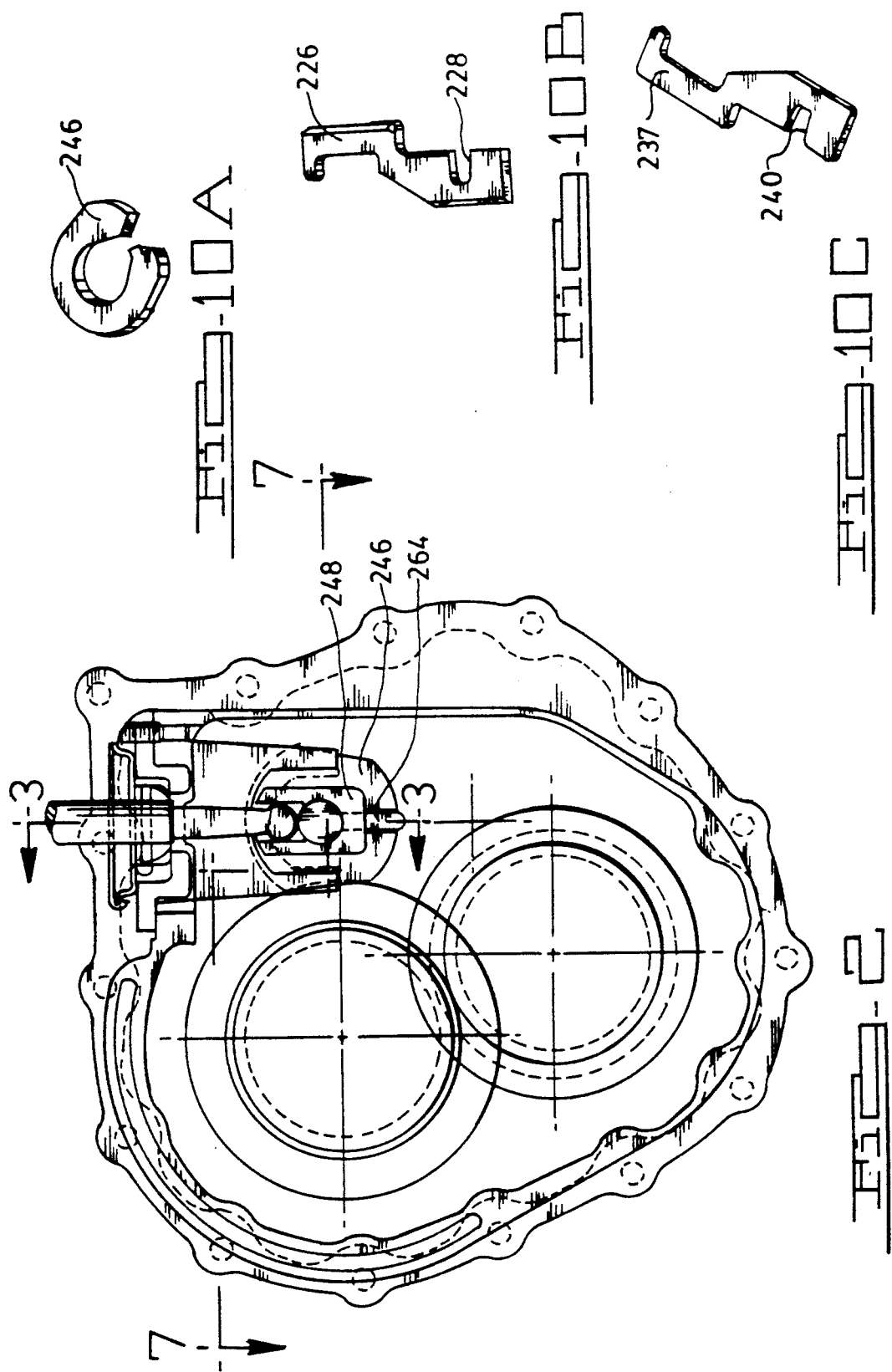

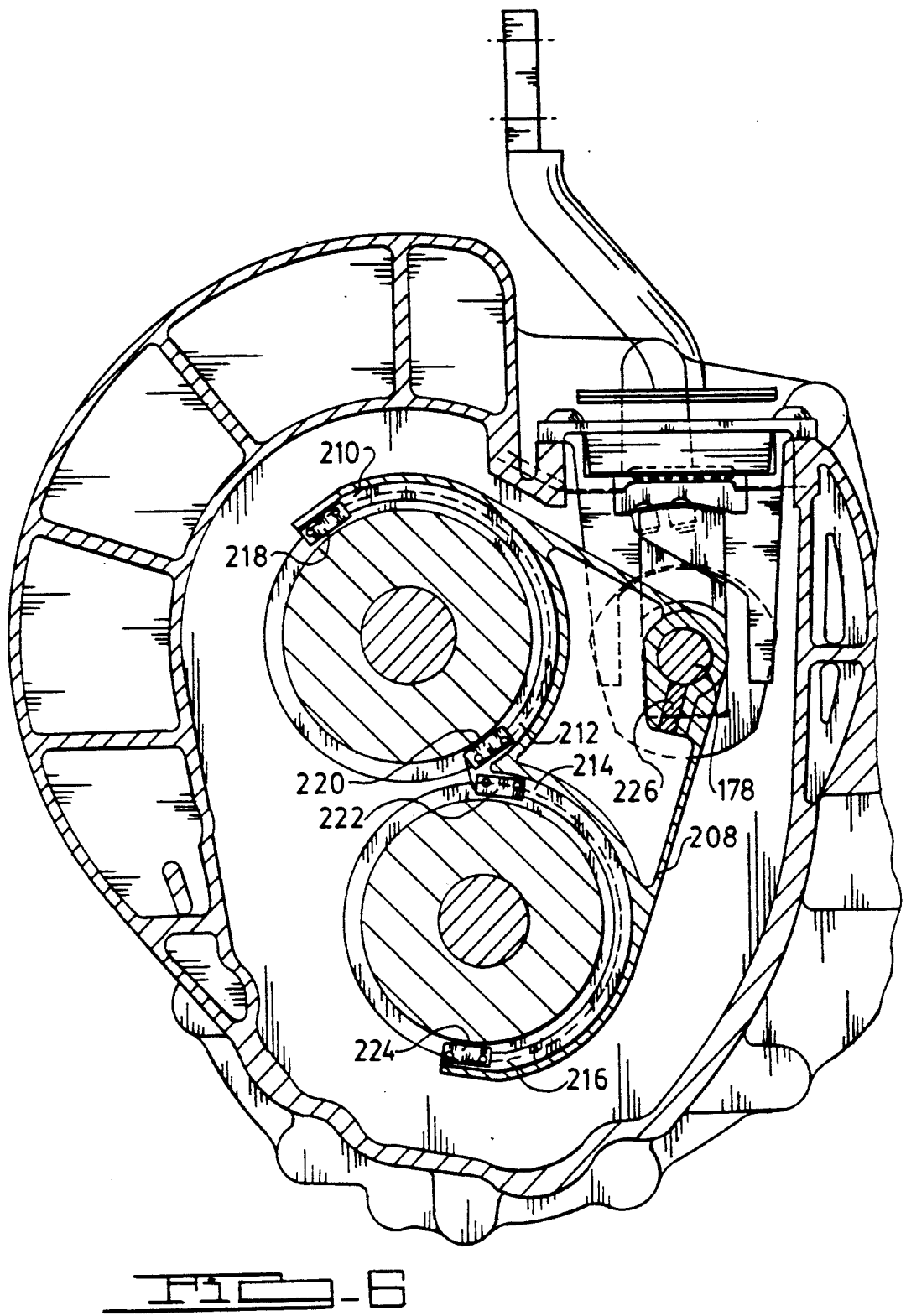

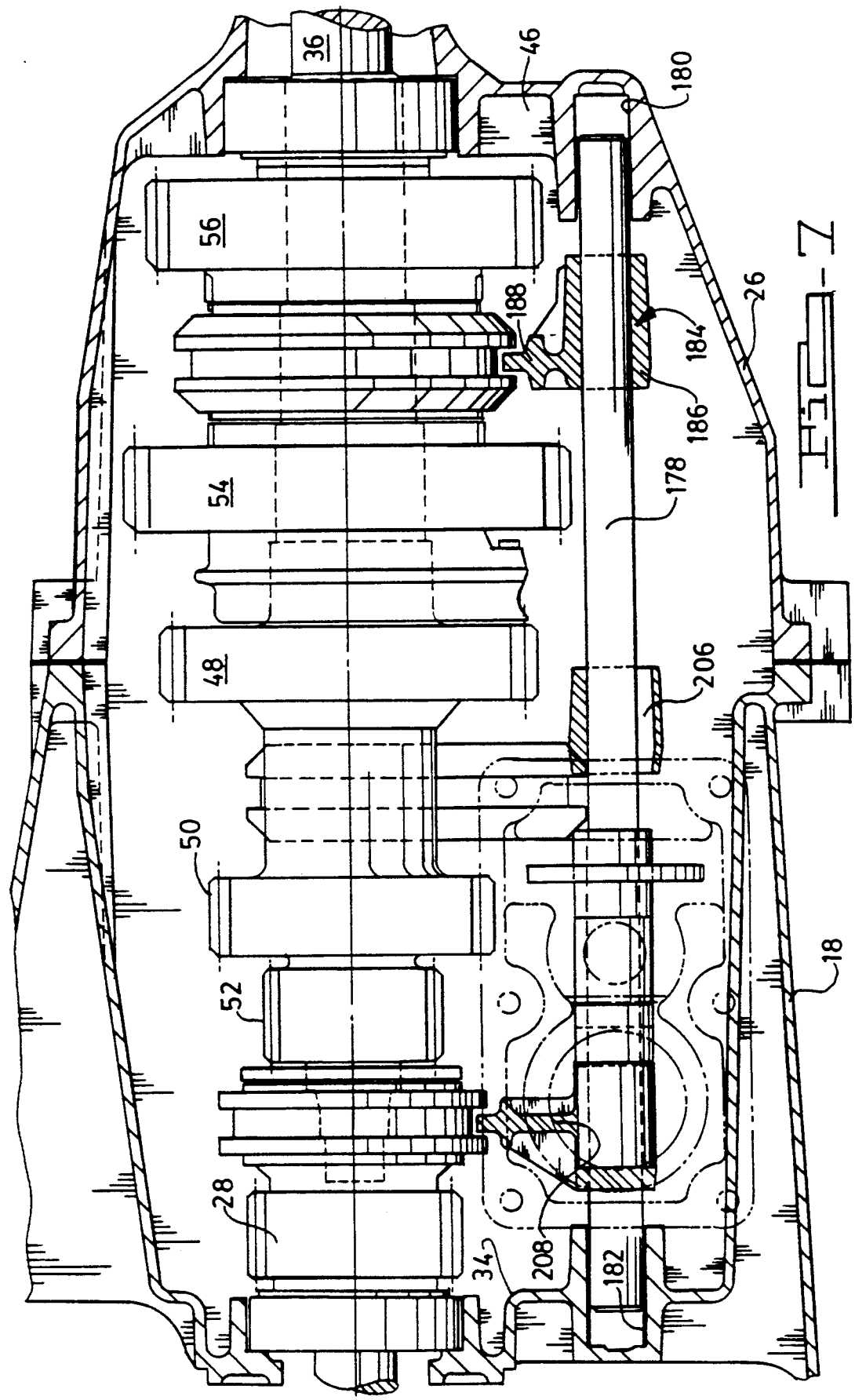

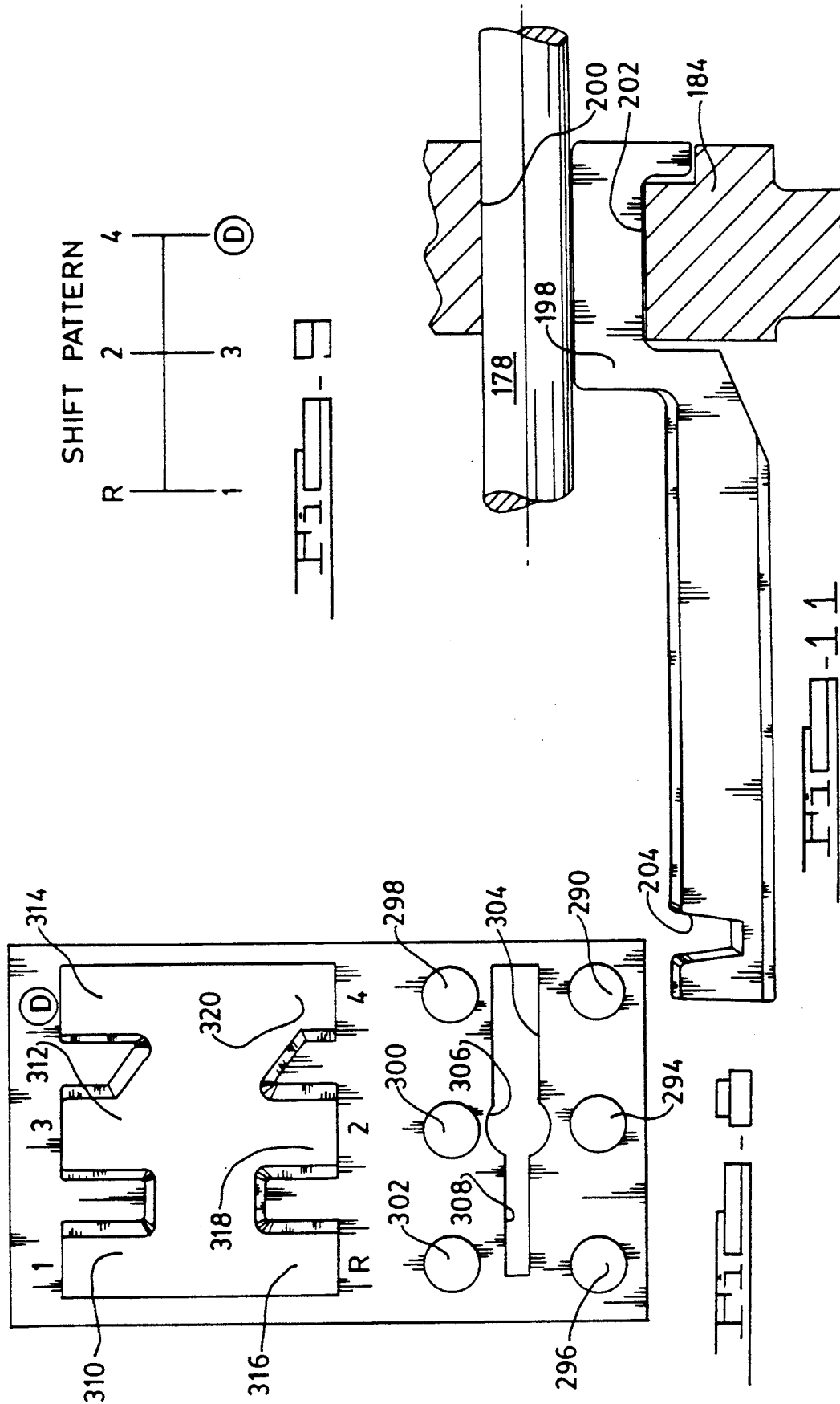

UNITARY RATIO SELECTOR MECHANISM FOR A MULTIPLE RATIO MANUAL TRANSMISSION

TECHNICAL FIELD

This invention relates to a manual power transmission mechanism for passenger vehicles and trucks and to improvements in a manually controlled ratio shift linkage for such transmissions.

BACKGROUND OF THE INVENTION

My invention relates to a transmission of the kind that I have disclosed in my copending patent application, Ser. No. 951,279 entitled "Multiple Ratio Manual Transmission" filed Sep. 25, 1992. My copending patent application is assigned to the assignee of my present invention. Reference may be made to the copending disclosure to supplement the description of my present invention.

A manual transmission of the kind disclosed in my copending application and other transmissions presently known in the art as illustrated in U.S. Pat. Nos. 4,222,281 and 4,799,399 comprise an input shaft, a mainshaft and a countershaft. The mainshaft and the countershaft respectively support torque transmitting gearing and cluster gear assembly gear elements. Synchronizer clutches are used to establish selectively each of several forward driving torque flow paths and at least a single reverse torque flow path. A driver operator shift lever is mounted on the transmission housing that encloses the mainshaft gears and the cluster gear assembly gear elements. The synchronizer clutches include clutch sleeves that are adapted to be shifted axially to establish and disestablish the torque flow paths.

A linkage mechanism for actuating the shift sleeves includes a shift fork for each sleeve. A mechanical connection is established between the driver-controlled shift lever and the individual shift forks by extensions or selector plates carried by each shift fork. The shift lever can be rotated in a plane transverse to the axis of the mainshaft or moved fore and aft in a plane parallel to the axis of the mainshaft as a mechanical connection is established and disestablished between the shift lever and the individual shift plates.

It is common practice in the prior art to provide a shift fork interlock that prevents shifting movement of one shift fork as a companion shift fork is selected by the driver and actuated as the driver shifts the shift lever in one direction or the other. An offset lever connected to one end of the shift lever is rotated or shifted axially by the shift lever as the selector plates and shift forks are selected by the operator. The shift forks may be mounted on and supported by a common shift rail arranged in parallel disposition with respect to the axis of the mainshaft.

In prior art constructions, it is usual practice to provide a motion controlling gate secured to the transmission housing. This establishes a motion pattern for the offset lever and the shift lever as the driver establishes and disestablishes the various transmission ratios. It also is common practice to mount the interlock mechanism on a stationary portion of the transmission independently of the mounting structure for the shift lever. Such arrangements introduce assembly problems because of the complexity of the shift linkage. Further, design tolerances that normally are associated in the design and manufacture of the transmission and the linkage mechanism introduce calibration errors that have the potential for misaligning the selector mechanism for the selector plates and for mislocating the synchronizer clutch sleeves.

BRIEF DESCRIPTION OF THE INVENTION

The improved transmission of my invention overcomes the shortcomings discussed above by providing an independent subassembly for the shift lever and the mounting structure for the shift lever.

The subassembly includes a shift lever motion controlling gate and gate follower which are independent of the transmission housing within which the gearing is situated. Further, the interlock mechanism normally secured to or formed in part by the transmission housing, usually at a remote location, is arranged in my improved transmission shift linkage in close proximity to the mounting structure for the shift lever. It also forms a part of the subassembly of which the shift lever and its mounting structure form a part. This permits independent assembly of the interlock structure, the shift lever and its mounting structure, the selector gate and the offset lever for the driver operated lever. Thus, tolerances can be controlled more precisely. Complexities of assembly are avoided because the subassembly described above can be inserted in an axis opening in the transmission housing that encloses the countershaft gear elements and the torque delivery gears on the mainshaft.

BRIEF DESCRIPTION OF THE FIGURES OF THE DRAWINGS

FIG. 2 is a cross-sectional view taken along the plane of section line 2—2 of FIG. 1A.

FIG. 6 is a cross-sectional view taken along the plane of section line 6—6 of FIG. 1A.

FIG. 7 is a cross-sectional view of the transmission of FIGS. 1A, 1B and 2 as seen from the plane of section line 7—7 of FIG. 2.

FIG. 8 is a planar view of a guide plate for the shift lever as seen from the plane of section line 8—8 of FIG. 3.

FIG. 9 is a diagrammatic representation of the shift pattern of motion for the operating end or bell crank portion of the driver-controlled shift lever.

FIG. 10A is an isometric view of an interlock plate used in an interlock assembly for the synchronizer clutch sleeves of the transmission of FIGS. 1A and 1B.

FIGS. 10B and 10C show shift fork selector plates that are secured to the 2-3 and 3-4 shift forks and which are adapted to be actuated by the driver-operated shift lever.

FIG. 11 is a partial assembly view showing the first and reverse (R) shift fork, a selector plate and a portion of the shift rail for the 1-R shift fork of the transmission of FIGS. 1A and 1B.

PARTICULAR DESCRIPTION OF THE INVENTION

Figure 1A:
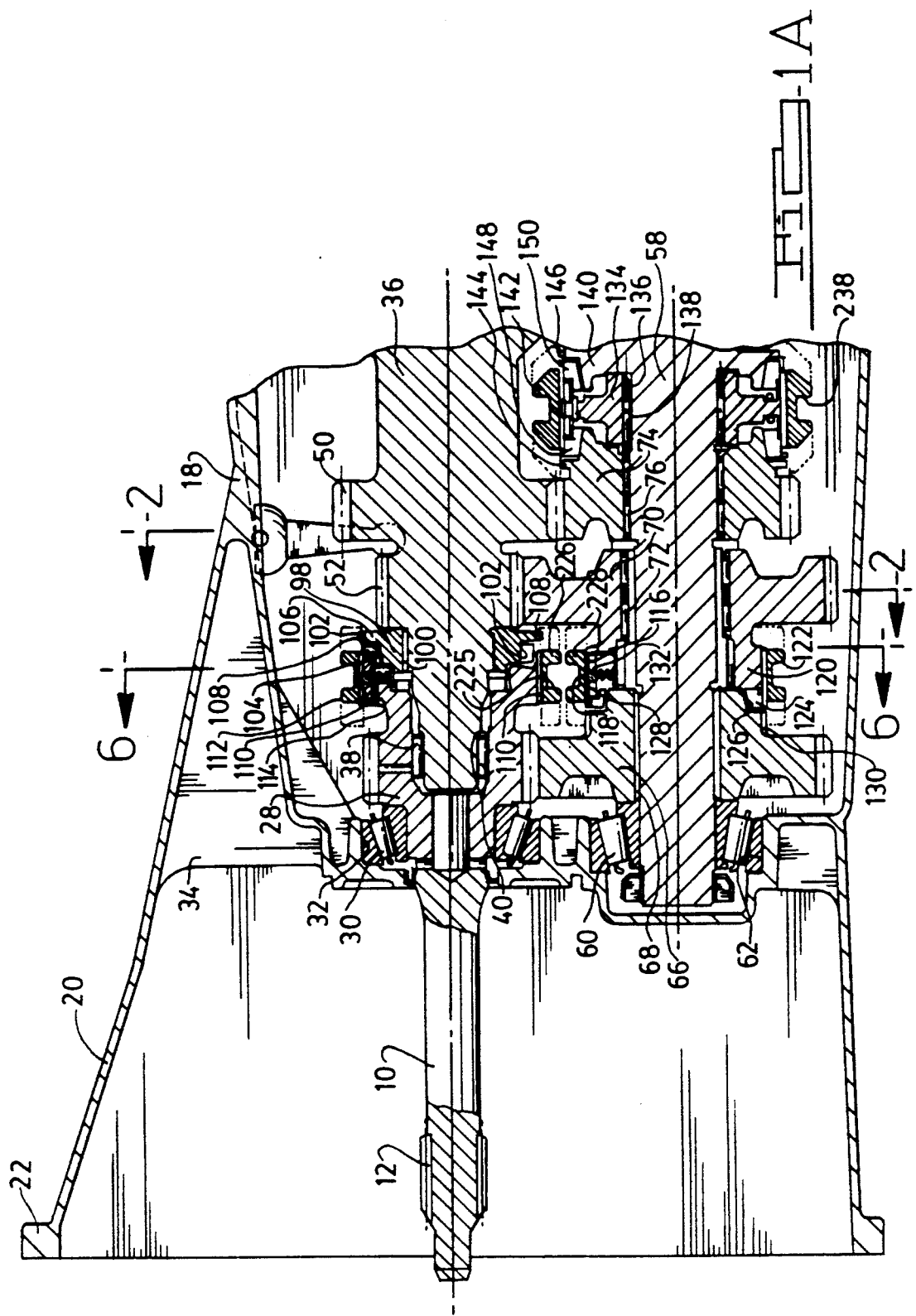
FIGS. 1A and 1B, taken together, show a cross-sectional view of a manual transmission incorporating the improvements of my invention.

Shown in FIG. 1A is a torque input shaft 10 which is splined at 12 to permit a driving connection between the shaft 10 and the hub of a clutch plate that forms a part of a driver-operated neutral clutch and flywheel assembly. The engine crankshaft is connected to the shaft 10 through the neutral clutch and flywheel assembly.

Figure 1B:
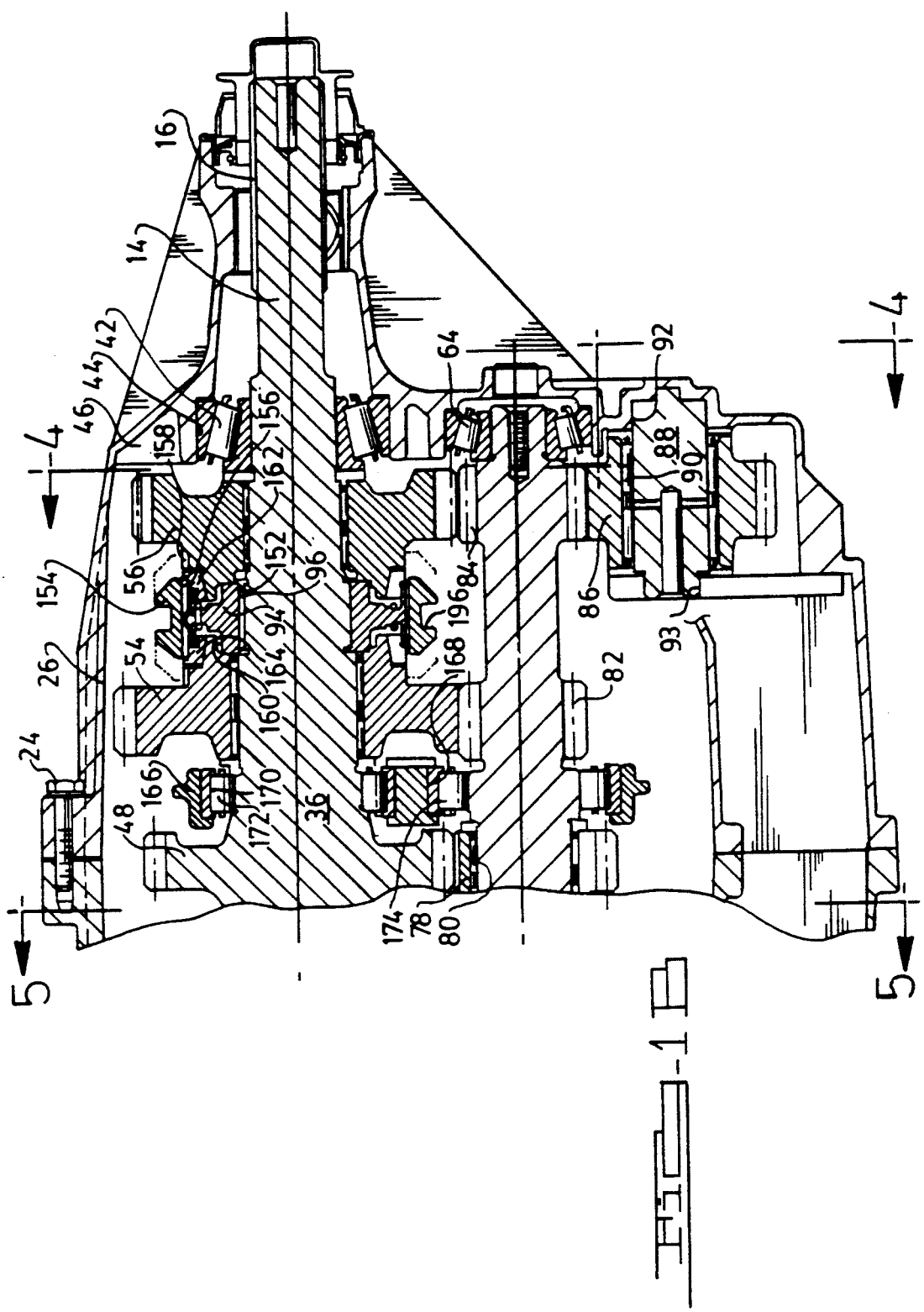

A driven shaft 14, shown in FIG. 1B, is splined at 16 to permit a driving connection with a drive yoke, which forms a part of a universal joint connection between the shaft 14 and the driveshaft. Torque is delivered to the vehicle traction wheels through the driveshaft and through the differential and axle mechanism.

The transmission of FIG. 1 includes a cast housing 18 having a clutch bell housing portion 20 adapted to be bolted or otherwise secured at its periphery 22 to the engine block of an internal combustion vehicle engine.

The housing 18 is secured by bolts 24 to one end of a companion housing portion 26, which encloses portions of the transmission gearing, to be described subsequently, and the tailshaft or driven shaft 14. The housing portions 18 and 26 form a unitary housing assembly.

A torque input gear 28 is connected to or formed integrally with the torque input shaft 10. It is journalled by tapered roller bearings 30 in a bearing opening 32 formed in forward wall portion 34 of the transmission housing 18.

A transmission mainshaft 36 extends through the housing portions 18 an 26 in coaxial disposition with respect to the axis of torque input shaft 10. It is journalled by bearing 38 in bearing opening 40 formed in the input gear 28. It is supported at the output side of the transmission by tapered roller bearing 42, which is received in bearing opening 44 of end wall 46 for the transmission housing portion 26.

The mainshaft 36 has formed thereon a second ratio gear 48, a third ratio gear 50, and a fifth ratio gear or overdrive gear 52.

Rotatably journalled on the right-hand side of the mainshaft 36 is a first ratio gear 54 and a reverse-drive gear 56.

A countershaft 58 is end supported in parallel disposition with respect to the mainshaft 36. It is journalled at its left-hand end by tapered roller bearings 60 disposed in bearing opening 62 formed in the transmission bearing support wall 34. The right-hand end of the countershaft 58 is supported by a tapered roller bearing 64 in the right-hand bearing support wall 46 of the housing portion 26. An input gear element 66 is splined at 68 to the countershaft 58. It meshes with torque input gear 28.

An overdrive gear element 70 is journalled by bearing 72 on the countershaft 58. A third ratio gear element 74 is journalled by bearing 76 on countershaft 58. A second ratio gear element 78 is journalled on countershaft 58 by bearing 80.

A first ratio gear element 82 is formed on or is directly connected to countershaft 58. It meshes continuously with first ratio gear 54. Similarly, gear element 78 meshes continuously with second ratio gear 48.

A reverse drive gear element 84 is formed on or is connected integrally with the countershaft 58. It meshes continuously with reverse-drive pinion 86, which is rotatably supported on pinion shaft 88 by bearing 90. Pinion shaft 88 is end supported in openings 92 and 93 formed in support walls that comprise a part of the housing portion 26.

In the view of FIG. 1B, reverse drive pinion 86 is shown out of position angularly with respect to the positions of the mainshaft and the countershaft. This is done for purposes of clarity. Actually, reverse drive pinion 86 meshes with reverse drive gear 56 journalled on the mainshaft.

A first and reverse synchronizer clutch hub 94 is splined at 96 to the mainshaft 36. A fourth and fifth ratio synchronizer clutch hub 98 is splined at 100 to the left-hand end of the mainshaft 36.

The clutch hub 98 has formed thereon a synchronizer cone clutch surface 102 that is adapted to be engaged by a synchronizer blocker ring 104. Hub 98 carries clutch teeth 106 which are aligned axially with respect to synchronizer blocker ring teeth 108. These teeth 108 and synchronizer clutch teeth 106 are engageable with internal clutch teeth 110 formed in synchronizer clutch sleeve 112. Input gear 28 carries external clutch teeth 114 which register with internal clutch teeth 110 of the synchronizer sleeve 112. When the sleeve 112 is shifted in the right-hand direction, the synchronizer sleeve forms a driving connection between input gear 28 and synchronizer clutch hub 98, thus establishing a direct driving connection between input shaft 10 and the mainshaft 36.

A thrust bar 116 engages blocker ring 104 when the sleeve 112 is shifted in the right-hand direction. The synchronizer detent 118 establishes a blocker ring engaging force as the synchronizer clutch sleeve 112 is shifted in a right-hand direction. When the synchronizer sleeve 112 is shifted in a left-hand direction, gear 28 is disengaged from synchronizer hub 98, thus disabling the torque flow path during fourth ratio operation.

A synchronizer clutch hub 120 is formed on fifth ratio gear element 70. A synchronizer clutch sleeve 122 having internal clutch teeth registers with the external teeth of the hub 120. A synchronizer blocker ring 124 is formed with a cone surface that engages cone synchronizer clutch cone surface 126 formed on the hub of input gear element 66. Thrust bars 128 engage the blocker ring 124 and exert a clutch engaging force in the left-hand axial direction as the sleeve 122 is shifted in the left-hand direction. This establishes a driving connection between input gear element 66 and the countershaft 58. The driving connection is established by external clutch teeth 130 formed on the hub of gear element 66 which engages the internal teeth of the clutch sleeve 122 after the clutch sleeve teeth passes through the blocker ring teeth of the blocker ring 124. The synchronizer clutch engaging force acting on the blocker ring 124 is established by spring-loaded detent ball 132.

The 2-3 synchronizer clutch hub 134 is splined at 136 to the countershaft 158 as seen in FIG. 1A. It is located adjacent synchronizer cone clutch elements 138 and 140 carried by the third ratio gear element 74 and the second ratio gear element 78, respectively. A 2-3 synchronizer clutch sleeve 142 is slidably supported on the hub 134, the latter being formed with internal clutch teeth that engage synchronizer clutch teeth 144 and 146 formed on the gear elements 74 and 78, respectively. As in the case of the synchronizer clutch construction described with reference to the input gear 28 and the overdrive gear 52, the 2-3 synchronizer clutch assembly includes a pair of blocker rings, as shown at 148 and 150, having internal cone clutch surfaces that engage external cone clutch surfaces on the hubs of the gears 74 and 78 as the sleeve 142 is shifted.

First and reverse synchronizer clutch hub 94 is splined at 152 to mainshaft 36. The first and reverse synchronizer clutch sleeve 154 is slidably positioned on the hub 94. When it is shifted in a right-hand direction, its internal teeth 156 engage external teeth 158 on reverse gear 56. When the sleeve 154 is shifted in the left-hand direction, its internal teeth drivably engage external teeth 160 on first ratio gear 54. Blocker ring 162 establishes synchronism in the usual fashion between the countershaft and gear 56 as it is shifted in the right-hand direction and blocker ring 164 similarly establishes synchronism between the countershaft 36 and the first ratio gear 54 as the sleeve 154 is shifted in the left-hand direction.

A bearing support in the form of a girdle 166 has two bearing openings 168 and 170. Countershaft 58 extends through bearing opening 168, and mainshaft 36 extends through opening 170. Mainshaft 36 is supported in the bearing girdle 166 by the intermediate bearing 172, and countershaft 58 is supported in the opening 168 by intermediate bearing 174. The bearing girdle 166 establishes a restraint against separation of the axes of the mainshaft 36 and the countershaft 58, thus opposing the tendency of the gear tooth mesh radial separating force components to bend the countershaft and to bend the mainshaft.

As seen in FIG. 7, a shift rail 178 extends through the transmission housing portions 18 and 26 in a direction parallel to the axis of the mainshaft 36. It is supported at one end in an opening 180 formed in end wall 46 of the housing portion 26. It is supported at the other end in an opening 182 formed in end wall 34 of the housing portion 18. Shift rail 178 is adapted to be shifted axially in the end openings 180 and 182 and to be rotated about its axis.

Figure 4:
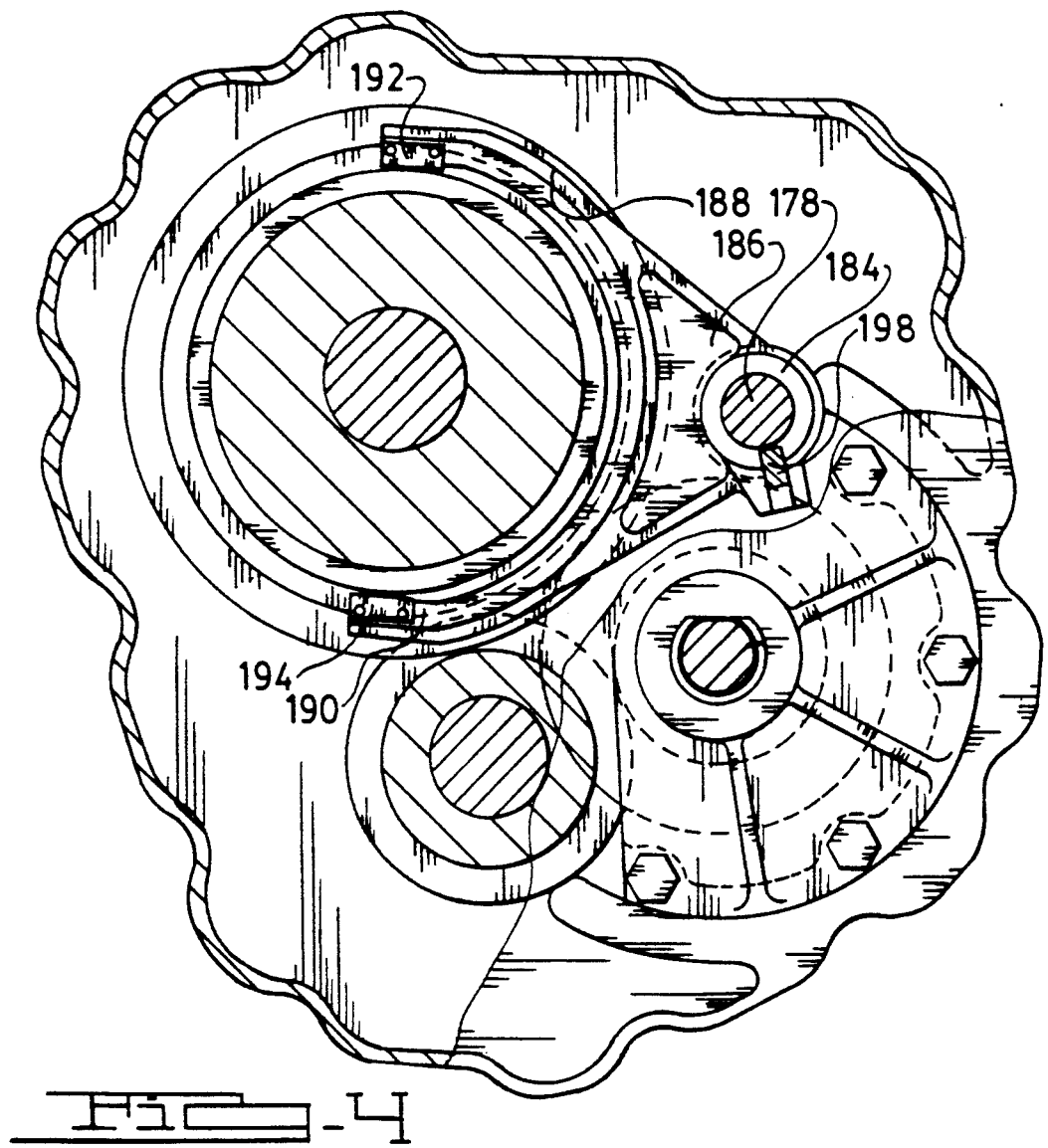
FIG. 4 is an end view, partly in section, showing the transmission,. of FIGS. 1A and 1B from the plane of section line 4—4 of FIG. 1B.

A shift fork for first and reverse is shown in FIG. 7 at 184. It includes a shift fork hub 186 and shift fork fingers, one of which is shown at 188 of FIG. 7. Shift fork 186 is shown more particularly in the cross-sectional view of FIG. 4. The shift finger 188 has a companion shift finger 190, as seen in FIG. 4. Shift fork pads 192 and 194 are carried by the ends of the shift fingers 188 and 190 and are received in synchronizing clutch sleeve groove 196, as seen in FIG. 1B. A shift selector plate is seen in cross-section in FIG. 4 and in FIG. 11 at 198. It is received in a slot formed in the hub of the shift fork 184, the latter encircling the shift rail 178.

The arrangement of the selector plate, the shift fork and the shift rail are best understood by referring to FIG. 11. The shift fork 184 has an opening in its hub as shown at 200 in FIG. 11. Shift rail 178 is received through the opening 200. A radial slot is formed in the hub of the fork 184 as shown at 202. The selector plate, which is formed with a generally "Z" shape, is received in the slot 202 and held in place in the slot by the shift rail 178 so that the shift rail, the selector plate and the shift fork form an operative assembly. As the shift fork is shifted in the direction of the axis of the shift rail 178, the selector plate will follow in unison. The selector plate is provided with a slot 204 which is adapted to receive a selector finger as will be explained subsequently with reference to FIG. 2 and FIG. 3.

Each of the synchronizer clutch sleeves is actuated by a shift fork similar to the one identified with reference to FIG. 11. As seen in FIG. 7, the shift fork for the 2-3 synchronizer is identified by reference numeral 206. The shift fork that actuates the fourth and fifth synchronizer clutch sleeve 112 is shown in FIG. 7 at 208.

The 4–5 synchronizer clutch shift fork 208, as seen in FIG. 6, has a compound synchronizer clutch finger arrangement. It includes a first pair of synchronizer clutch fingers 210 and 212. It includes a second pair of synchronizer clutch fingers, as shown at 214 and 216. Located at the end of each finger is a shift finger pad identified by reference numerals 218, 220, 222 and 224.

The pads 218 and 220 engage or register with synchronizer clutch sleeve groove 225 in the sleeve 112. Similarly, synchronizer clutch sleeve groove 228 receives shift fork pads 222 and 224. Thus, it is seen that as the shift fork as shown in FIG. 6 is moved axially with respect to the axis of the shift rail 178, the synchronizer clutch sleeves 112 and 122 will move together in unison, either in the right-hand direction or the left-hand direction. Movement in the left-hand direction will cause disengagement of the mainshaft 36 from the input shaft 10. Simultaneously, a driving connection will be established between input gear element 66 and overdrive gear element 70, as seen in FIG. 1A.

The hub of shift fork 208 carries a selector plate shown in cross section in FIG. 6 at 226. The plane of the selector plate 226 is angularly offset relative to the plane of selector plate 198 seen in FIG. 4.

Figure 5:
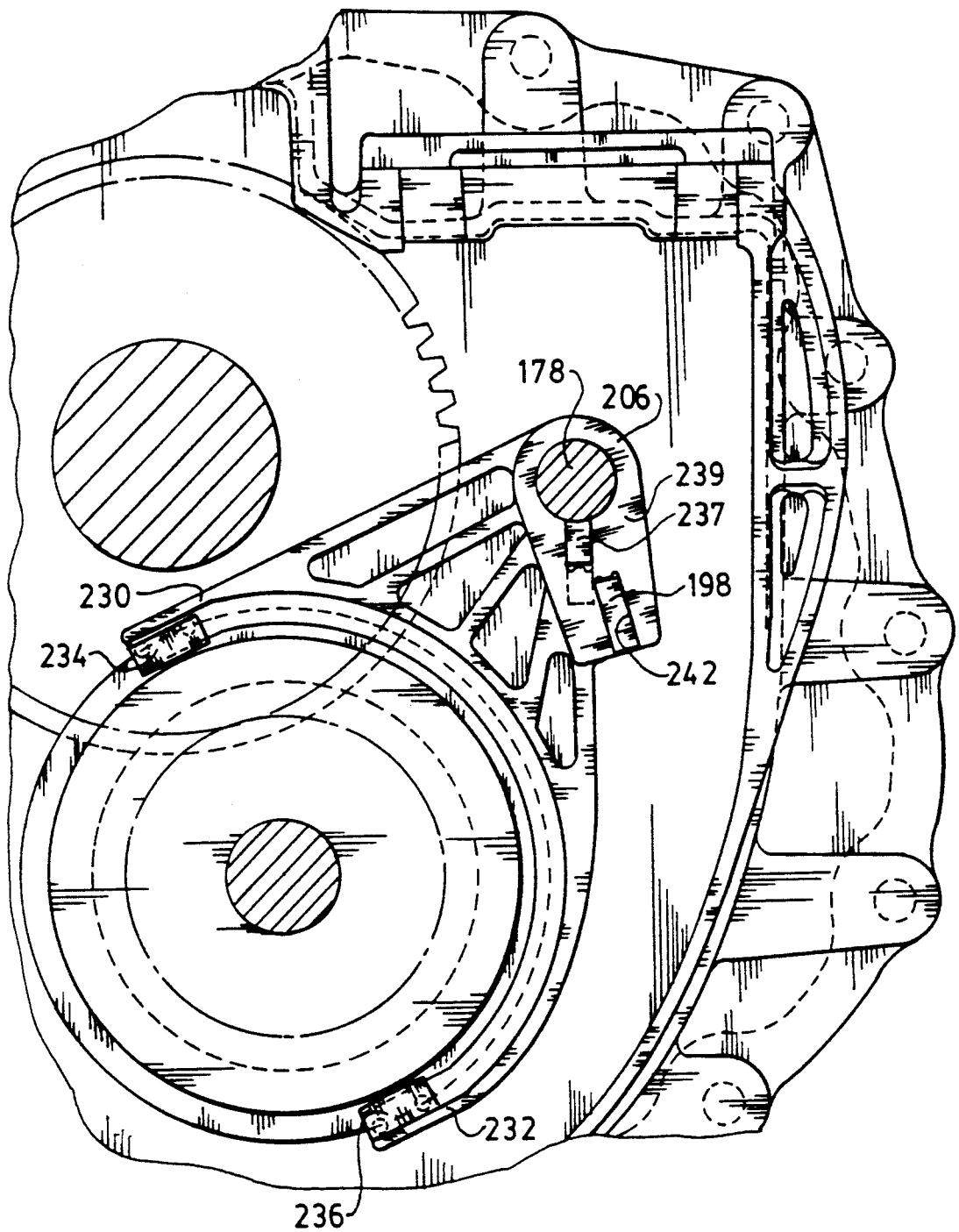
FIG. 5 is a cross-sectional view of the transmission of FIG. 1 as seen from the plane of section line 5—5 of FIG. 1B.

FIG. 10B shows selector plate 226, seen also in FIG. 6. FIG. 5 shows the shift fork 206 the 2-3 synchronizer clutch sleeve 142. Like the other shift forks, it is slidably supported on shift rail 178. It includes a pair of shift fork fingers 230 and 232 which respectively carry shift finger pads 234 and 236. The synchronizer clutch sleeve groove, shown in FIG. 1A at 238, receives the shift finger pads 234 and 236.

As previously described with reference to the shift fork 208 of FIG. 6 and the shift fork of FIG. 4, the 2-3 synchronizer shift fork is assembled with a selector plate shown at 237 in FIG. 5. The details of the selector plate are seen best in FIG. 10C. The selector plate 237 corresponds in shape generally to the selector plate 198 shown in FIG. 11. It includes a slot 240 for receiving a selector pin, as will be described with reference to FIGS. 2 and 3.

The plane of the selector plate 237 is angularly offset with respect to both the plane of selector plate 226 of FIG. 6 and the plane of selector plate 198, as seen in FIG. 4.

Figure 3:
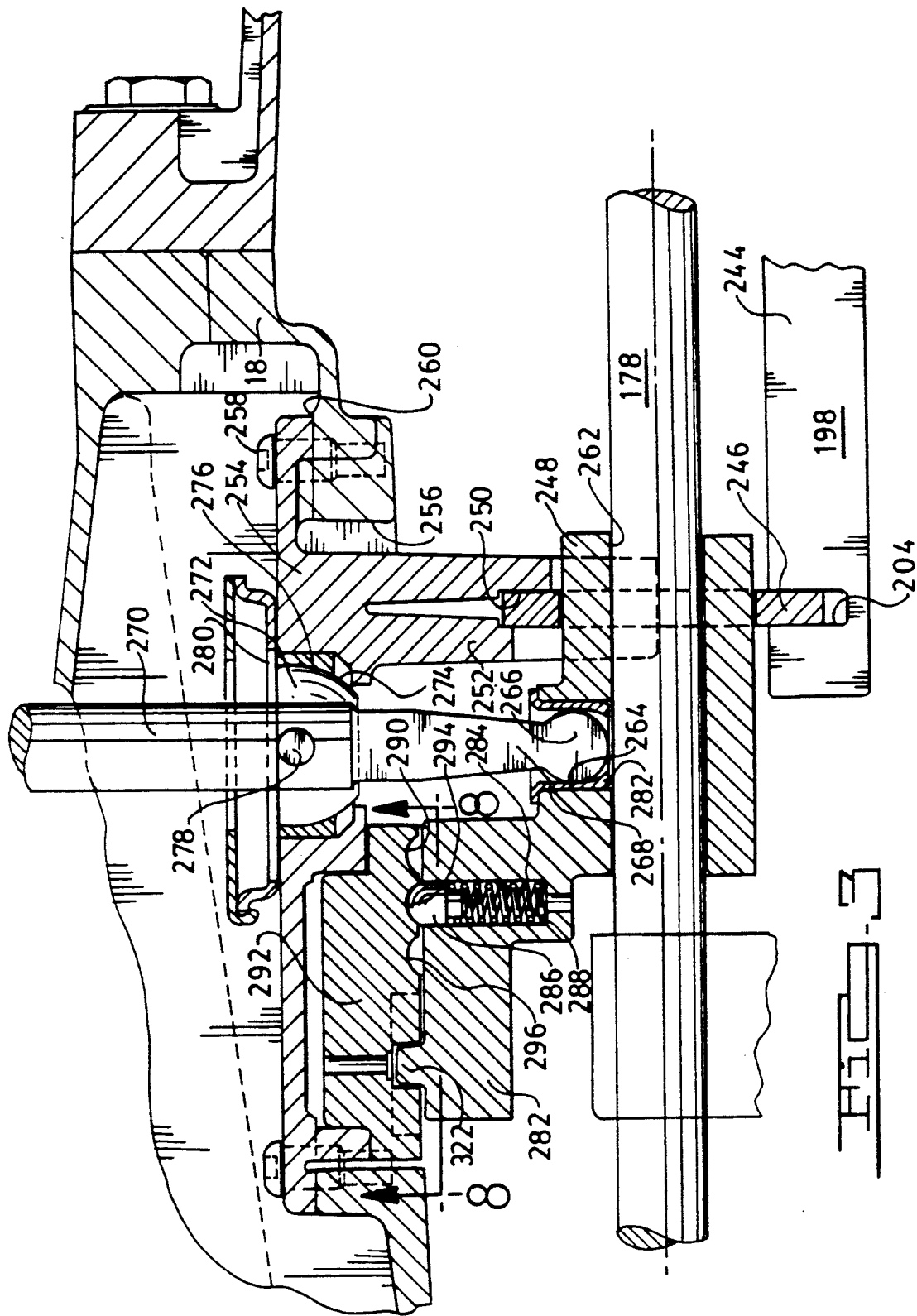
FIG. 3 is a cross-sectional view showing a portion of the driver-controlled shift linkage and the shift rail guide plate for the transmission of FIGS. 1A and 1B. It is a cross-sectional view taken along the plane of section line 3—3 of FIG. 2.

In FIG. 5, there is shown at 239 an extension of the hub of shift fork 206 for the 2-3 synchronizer clutch sleeve 154. Extension 239 projects radially from the axis of shift rail 178. It is formed with a slot 242 at its outermost end. Slot 242 is angularly displaced, as shown in FIG. 5, with respect to the plane of the 2-3 selector plate 237. The slot 242 receives the intermediate portion of a selector plate 198 for the first and reverse synchronizer clutch sleeve 154 and provides support for the extended selector plate 198. The intermediate portion of the selector plate 198 is shown in FIG. 3 at 244.

An interlock plate 246 is adapted to be received in the slot 204 in the selector plate 198. This interlock plate is shown in FIG. 10A. It generally is of a horseshoe shape. It is rotatably mounted on a shift lever guide sleeve 248 as shown in FIG. 3. It is disposed in a retaining slot 250 formed on stationary boss 252 which forms a part of a shift lever support 254.

The housing portion 18 is provided with an opening 256 at the top of the housing. The support 254 is assembled through the opening 256 and bolted by fasteners 258 to a mounting shoulder 260 which forms a part of the housing portion 18.

The guide sleeve 248 has a central opening 262 which receives the shift rail 178. When the interlock is rotated so that the slot 204 receives one of the arms of the horseshoe-shaped interlock plate 246, axial movement of the selector plate 198 and axial movement of the first and reverse shift fork is prevented.

Shown in FIG. 2 is a selector finger 264 on sleeve 248 which is adapted to be received in the slot 204 when it is rotated about the axis of the shift rail 178 into the plane of the selector plate 198. When it is moved out of the plane of selector plate 198, the interlock plate 246 enters the slot 204 as seen in FIG. 3.

When the selector finger 264 is adjusted to the vertical position as shown in FIG. 2 the selector finger 264 will enter the slot 240 for the 2–3 shift fork selector plate 237 shown in FIG. 10C. When the selector finger 264 is moved out of the plane of the selector plate 237, the interlock plate 246 will enter the slot 240.

When the selector finger 264 is moved to the angular position shown in FIG. 6, it enters the slot 228 of the plate 226 for the fourth and fifth ratio selector fork 208. At that time, the interlock plate is moved by the selector finger to the blocking position for selector plate 198 and selector plate 237.

As seen in FIG. 3, the sleeve 248 has a radial pocket or opening 265 which receives a spherical end 266 of a bell crank portion 268 of a driver-controlled shift lever 270. The shift lever 270 extends through a shifter pivot 272 having a cylindrical outer surface 274 received in a spherical bearing 276. The support 254 has a radial opening that receives the spherical bearing 276. A pivot pin 278 extends through the shift lever 270 and through pivot pin openings in the support 254. A retainer cap 280 is disposed over the bearing opening for the spherical bearing 276.

The spherical end 266 acts against a cylindrical bearing insert 281 formed in the sleeve 248.

An offset lever 282 is carried by and preferably formed integrally with the sleeve 248. A detent spring opening 284 is formed in the offset lever 282 and receives a detent element 286 which is urged in a radially outward direction, as viewed in FIG. 3, by detent spring 288. Detent element 286 engages detent recesses formed in guide plate 292.

In FIG. 3, the detent element 286 is shown engaged in detent recess 294. A third detent recess corresponding to the first ratio position is shown at 296.

The detent recesses 290, 294 and 296 are shown in the plan view of FIG. 8. Companion detent recesses 298, 300 and 302 also are formed in the guide plate 292. Detent recesses 296, 294, 290, 298, 300 and 302 correspond respectively to the reverse ratio position of the shift lever, the second ratio position, the fourth ratio position, the fifth ratio position (also identified as the D position), the third ratio position and the first ratio position.

As seen in FIG. 8, a neutral recess in the form of an elongated groove 304 is located between the group of recesses 302, 300 and 298 and the group of recesses 296, 294 and 290. The portion of the recess 304 adjacent recesses 300 and 294 is enlarged, as shown at 306, since the shift lever normally is located between the recesses 300 and 294. A shift feel or extra shift effort then is required to move the shift lever as the bell crank portion 268 is shifted either to the right or to the left. If the detent element 286 is moved between the detents 302 and 296, further resistance to movement of the bell crank portion 268 is experienced to provide greater shift feel as the first ratio or the reverse ratio is selected. This is achieved because the detent element 286 is under greater compression when the detent element 286 is in the reverse position or the first position. The greater spring compression is achieved because the width of the recess 304 is decreased as shown at 308 when the bell crank portion 268 is moved to the left of the center neutral position.

Guide plate 292 is formed with six slots as shown at 310, 312, 314, 316, 318 and 320. Slot 310 corresponds to the first ratio position. This is directly opposite the slot 316, which corresponds to the reverse drive position. Slot 312 corresponds to the third ratio position and slot 318, which is directly opposite the slot 312, corresponds to the second ratio position. Slots 314 and 320, which are directly opposed, one in respect to the other, correspond respectively to the fifth ratio and the fourth ratio.

A guide lug 322, shown in FIG. 3, is received in the slots 310 through 320 as the offset lever 282 is adjusted angularly with respect to the axis of the shift rail 178 and is shifted axially with respect to the axis of shift rail 178.

As the shift lever 270 moves, the offset lever 282 controls the direction and the extent of axial travel of the sleeve 248 and the selector finger 264 shown in FIG. 2.

Each of the slots 204, 228 and 240 in the selector plates is aligned in the plane of the selector finger 264 and the plane of the interlock plate 246 when the detent element 286 is in the center or neutral position in the elongated recess 304. Because the selector plates are angularly oriented, one in respect to the other about the axis of the shift rail 178, the selector finger 264 will pick-up and register with one or the other of the slots in the selector plates as the interlock plate registers with the slots in the other selector plates that are not picked up by the selector finger 264. This angular movement of the selector finger occurs as the shift lever 270 is shifted in a transverse plane about the shifter pivot structure. Movement of the selector lever in this fashion rotates the guide plate 282 in one direction or the other. A fore and aft shifting movement of the selector lever, which would correspond to clockwise or counterclockwise adjustment of the selector lever shown in FIG. 3 about the shifter pivot, will cause the selector plate that is picked up by the selector finger to shift axially in one direction or the other depending upon whether the movement of the selector lever 270 is clockwise or counterclockwise as viewed in FIG. 3.

FIG. 9 shows the shift pattern for the bell crank lever. The reverse position and the first position are in a common plane, which will make it possible for the vehicle to be rocked between reverse and low range without shifting the plane of movement of the bell crank portion of the shift lever.

Normally, the first ratio position shown in FIG. 9 is a creeper gear position. It is not usually used during acceleration of the vehicle on a normal road surface. Rather, the lowest gear is in the plane that contains the neutral position of the bell crank portion. It merely is necessary then for the vehicle operator to shift downward from the upper second ratio position to the third ratio position by a simple pulling effort on the shift cane without the need for changing the plane of movement of the shift lever. To shift to the next highest ratio, which is the fourth ratio, merely requires the operator to push the shift lever back to the neutral position and then to the right until the bell crank lever is in the plane of the fourth and fifth ratio detents.

As best seen in FIG. 7, the shift lever and the guide plate are located at a mid-position in the transmission and on the left side of the axis of the mainshaft. (The left side of the mainshaft axis is at the bottom of FIG. 7.) During a normal installation in a vehicle, the engine would be forward and the left side of FIG. 7 would be the torque input side. The tail shaft for the transmission would be to the right in FIG. 7. The vehicle operator, in a left-hand drive vehicle, normally would be positioned in the driver's seat adjacent the transmission housing with the shift lever located between the driver position and the axis of the mainshaft. This is a convenient location that makes the shift lever more convenient to the operator and easier to operate.

This arrangement requires a location of the fifth and fourth ratio synchronizer assemblies to be remotely positioned relative to the first and reverse synchronizer clutch assembly. The shift lever and the bell crank portion, together with the guide plate, are located between the synchronizer clutch assembly for the fourth and fifth ratios and the synchronizer assembly for the second and third ratios. This, of necessity, requires the interlock plate and the selector finger to be remotely positioned with respect to the first and reverse shift fork. Because of the necessary length of the selector plate for the first and reverse shift fork, the hub of the shift fork for the 2-3 synchronizer clutch, together with the slot 242 as shown in FIG. 5, provide intermediate support that maintains precise positioning of the selector plate for the first and reverse shift fork.

The unitary subassembly that comprises the shift lever, the bell crank portion, the offset lever and guide plate facilitate assembly of the transmission. Furthermore, it minimizes the stack-up tolerances that normally would be associated with having a guide plate secured to a housing portion that is not integrally associated with the offset lever and the location of the interlock plate, as well as the location of the slots in the selector plates that are picked up by the selector finger. The elimination of variations in the stack-up tolerances thus greatly improves the overall reliability of the transmission.

To establish first forward drive ratio, the synchronizer clutch sleeve 154 is shifted in a left hand direction while the synchronizer clutch sleeve 142 and the pair of synchronizer clutch sleeves 122 and 112 assume their neutral positions. Thus, engine torque is delivered through the input gear 28, through countershaft gear element 66, through the countershaft, through gear 82 and through gear 54 to the output shaft 14. The bell crank portion 266 of the shift lever 270 is moved at that time so that the guide lug 322 enters the slot 310 of FIG. 8. This is the so-called creeper gear ratio. Shifting movement of the shift lever in the same shift plane will cause the guide lug to move from the slot 310 of FIG. 8 and through the neutral position to the slot 316 corresponding to the reverse drive position. The angular position of the selector finger thus does not change. Only the direction of motion of the selector plate 198 is changed. The interlock plate at that time is shifted by the selector finger into the slots 228 and 240 of the other two selector plates 226 and 237, thereby retaining those plates axially fast.

The second ratio is achieved by moving the synchronizer clutch sleeve 142 in a right hand direction while the other synchronizer clutch sleeves are returned to their neutral positions. This is accomplished by adjusting the shift lever so that the bell crank portion will cause the guide lug to shift to the next plane corresponding to the slots 312 and 318 of FIG. 8. The selector finger at that time enters the slot 228 of the selector plate 226. Simultaneously, the interlock plate 246 enters the slots 240 and 204 of the selector plates 238 and 198. Thus, torque is transferred from the input shaft and through the gear element 66, through the gear element 78, through the gear 48 and through the countershaft to the driven shaft.

The third ratio is accomplished merely by moving the selector lever so that the selector plate 237 will move in the opposite direction thereby causing synchronizer clutch sleeve 142 to shift in a left hand direction, thus locking the gear element 74 to the countershaft. Torque then is distributed through the input gear and through the gear element 66, through the gear element 74, through gear 50 and through the intermediate shaft to the driven shaft.

Direct drive ratio is achieved by shifting the shift lever so that the guide lug will shift to the next plane in which slots 314 and 320 are located. At that time, the interlock plate will lock the selector plates for the other synchronizers, and the selector plate for the sleeve 112 will be shifted in a right hand direction, thereby locking the input gear to the mainshaft 36. The selector plate for the synchronizer sleeve 196 and synchronizer sleeve 142 then will be locked by the interlock plate.

To establish overdrive, clutch sleeve 228 is shifted in a left hand direction thus connecting the countershaft to the gear element 70. Synchronizer sleeve 112 moves with sleeve 122 to its left hand position, which is an inactive position, thereby interrupting the direct drive connection between input gear 28 and the mainshaft. Torque then is distributed from the input gear to the gear element 66 through the overdrive gear element 70 and through the overdrive gear 52 and the mainshaft 36 to the driven shaft.

Having a described a preferred embodiment of my invention,

What I claim and desire to secure by United States Letters Patent is:

1. A manual transmission having gearing adapted to deliver torque from a driving shaft to a driven shaft including a housing, multiple ratio gearing in said housing, and a torque input gear connected to said driving shaft;

a mainshaft connected to said driven shaft torque transfer gearing including gears disposed coaxially with respect to said mainshaft;

a countershaft disposed in offset parallel disposition with respect to said mainshaft, countershaft gear elements disposed coaxially with respect to said countershaft;

multiple synchronizer clutch means for selectively establishing and disestablishing plural torque flow paths through said gears and said gear elements, said synchronizer clutch means including multiple synchronizer clutch sleeves that are shiftable between two axial positions relative to the mainshaft;

a shift rail offset from said mainshaft, multiple shift forks supported by said shift rail;

a shift lever including a bellcrank extending transversely relative to said shift rail, shift lever support structure adapted to be secured to said housing;

a guide plate for said shift lever secured to said support structure, means for pivotally mounting said shift lever on said support structure;

said shift lever, said guide plate and said support structure defining a unitary subassembly separate from said gearing, an offset lever operatively connected to said bellcrank whereby movement of said lever in a transverse plane causes angular movement of said offset lever and movement of said lever in a plane parallel to said shift rail results in movement of said offset lever in an axial direction, the position of said shift lever and said offset lever thereby being established with precision relative to said gears and said gear elements.

2. The combination as set forth in claim 1 wherein said guide plate has multiple guide grooves formed therein, a guide lug on said offset lever engagable with said grooves whereby the motion pattern of said shift lever is determined by the pattern of said grooves;

a selector finger carried by said offset lever;

said synchronizer clutch means including selector plates extending toward said selector finger and being selectively engaged by said selective finger as said shift lever moves through its motion pattern in accordance with the pattern of said guide plate grooves; and interlock means forming a part of said unitary subassembly for preventing simultaneous movement of two selector plates toward a torque flow path establishing position.

3. The combination as set forth in claim 2 wherein each synchronizer clutch means includes a clutch sleeve that is axially adjustable between a torque flow establishing position and a neutral position wherein torque flow is interrupted;

said interlock means including an interlock plate carried by said mounting structure and engageable with each of said selector plates when each selector plate for each synchronizer clutch means is in an axial position corresponding to said neutral position of said clutch means.

4. The combination as set forth in claim 1 wherein said subassembly includes registering detent elements carried by said offset lever and said guide plate whereby the torque flow path establishing positions and neutral positions between said torque flow establishing positions are precisely defined.

5. The combination as set forth in claim 2 wherein said subassembly includes registering detent elements carried by said offset lever and said guide plate whereby the torque flow path establishing positions and neutral positions between said torque flow establishing positions are precisely defined.

6. The combination as set forth in claim 3 wherein said subassembly includes registering detent elements carried by said offset lever and said guide plate whereby the torque flow path establishing positions and neutral positions between said torque flow establishing positions are precisely defined.

* * * * *

UNITED STATES PATENT AND TRADEMARK OFFICE
CERTIFICATE OF CORRECTION

PATENT NO. : 5,291,799
DATED      : March 8, 1994
INVENTOR(S) : Robert L. Seaman It is certified that error appears in the above-identified patent and that said Letters Patent is hereby corrected as shown below:

Column 7, lines 49-50, delete "A third detent recess corresponding to the first ratio position is shown at 296."

Column 10, line 54, claim 1, after "shaft" insert --,--.

Signed and Sealed this

Sixth Day of September, 1994

Attest:

BRUCE LEHMAN

*Attesting Officer*   *Commissioner of Patents and Trademarks*